(12) United States Patent
Yasoshima et al.

(10) Patent No.: US 11,050,247 B2
(45) Date of Patent: Jun. 29, 2021

(54) POWER SUPPLY SYSTEM

(71) Applicant: TOYOTA JIDOSHA KABUSHIKI KAISHA, Toyota (JP)

(72) Inventors: Juni Yasoshima, Toyota (JP); Junta Izumi, Nagoya (JP); Kenji Kimura, Miyoshi (JP); Toshihiro Katsuda, Toyota (JP); Kohei Matsuura, Anjo (JP); Junichi Matsumoto, Toyota (JP); Shuji Tomura, Nagakute (JP); Shigeaki Goto, Nagakute (JP); Naoki Yanagizawa, Nagakute (JP); Kyosuke Tanemura, Nagakute (JP); Kazuo Ootsuka, Nagakute (JP); Takayuki Ban, Nishio (JP); Hironobu Nishi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/686,579

(22) Filed: Nov. 18, 2019

(65) Prior Publication Data
US 2020/0169080 A1 May 28, 2020

(30) Foreign Application Priority Data

Nov. 28, 2018 (JP) .............................. JP2018-222766

(51) Int. Cl.
*H02J 1/10* (2006.01)
*H02J 7/00* (2006.01)
*H02M 3/158* (2006.01)

(52) U.S. Cl.
CPC .............. *H02J 1/10* (2013.01); *H02J 7/0024* (2013.01); *H02M 3/158* (2013.01)

(58) Field of Classification Search
CPC ........ H02J 1/102; H02J 7/0024; H02J 7/0013; H02J 1/10; H02J 7/0032; H02M 3/158; Y02T 10/70
See application file for complete search history.

(56) References Cited

U.S. PATENT DOCUMENTS

| 2014/0021923 | A1 | 1/2014 | Uchida |
| 2014/0327400 | A1* | 11/2014 | Kudo ...................... B60L 50/51 320/118 |

(Continued)

FOREIGN PATENT DOCUMENTS

| JP | 5605401 B2 | 10/2014 |
| JP | 2018-074709 A | 5/2018 |
| WO | 2018/079664 A1 | 5/2018 |

*Primary Examiner* — Carlos Amaya
*Assistant Examiner* — Esayas G Yeshaw
(74) *Attorney, Agent, or Firm* — Oliff PLC

(57) ABSTRACT

The present teaching provides a power supply system capable of fully utilizing a plurality of batteries having different performances. A power supply system disclosed here includes a main line, a plurality of sweep modules, and a controller. Each of the sweep modules includes a battery module and an electric power circuit module. The electric power circuit module includes a switching device for connecting a connection state between the battery modules and the main line between connection and disconnection. The controller performs sweep control of sequentially switching the battery module connected to the main line among the plurality of battery modules. During an input of electric power from outside, the controller disconnects the battery module whose SOC level satisfies a high SOC condition from the main line (S7), and continues sweep control (S8, S9).

2 Claims, 5 Drawing Sheets

(56) References Cited

U.S. PATENT DOCUMENTS

| | | | | |
|---|---|---|---|---|
| 2015/0105947 A1* | 4/2015 | Chang | ............... | H02J 7/00 |
| | | | | 701/22 |
| 2015/0349387 A1* | 12/2015 | Inaba | ............... | G05B 15/02 |
| | | | | 700/297 |
| 2016/0047862 A1* | 2/2016 | Shimizu | ............... | B60L 58/16 |
| | | | | 702/63 |
| 2016/0261007 A1* | 9/2016 | Furukawa | ............... | H01M 10/4285 |
| 2017/0057372 A1* | 3/2017 | Loftus | ............... | G01R 31/396 |

\* cited by examiner

POWER SUPPLY SYSTEM

CROSS REFERENCE TO RELATED APPLICATIONS

This application claims the benefit of priority to Japanese Patent No. 2018-222766 filed on Nov. 28, 2018. The entire contents of this application are hereby incorporated herein by reference.

BACKGROUND

1. Technical Field

The present teaching relates to a power supply system including a plurality of modules each including a battery and a circuit.

2. Description of the Related Art

A power supply device known to date includes a plurality of modules each including a battery and a circuit, and each of the modules is controlled to perform at least one of outputting of electric power to the outside and storing of electric power input from the outside. For example, a power supply device described in Japanese Patent Application Publication No. 2018-74709 includes a plurality of battery circuit modules each including a battery, a first switching device, and a second switching device. The battery circuit modules are connected in series through output terminals thereof. A control circuit for the power supply device outputs gate signals for turning the first switching device and the second switching device on and off, to the battery circuit modules at every given time. In this manner, a target level of electric power is output from the battery circuit modules.

SUMMARY

In a power supply device including a plurality of modules each including a battery, a plurality of batteries having different performances can be mixed in the power supply device in some cases. If the batteries having different performances are used in the same manner, performance of the entire power supply device can be restricted by batteries having low performance among the plurality of batteries. In this case, it is difficult to fully utilize batteries having high performance.

The present teaching typically provides a power supply system capable of fully using a plurality of batteries having different functions.

In view of this, a power supply system in an aspect of this disclosure includes: a main line configured to energize at least electric power input from outside; a plurality of sweep modules connected to the main line; and a controller, wherein each of the plurality of sweep modules includes a battery module including at least one battery, and an electric power circuit module including at least one switching device that switches a connection state between the battery module and the main line between connection and disconnection, and the controller is configured to perform a first process of performing sweep control of sequentially switching the battery module connected to the main line among the plurality of battery modules by outputting a gate signal for controlling the switching device to the electric power circuit module, and a second process of performing the sweep control by detecting an SOC in each of the battery modules while electric power is input from outside through the main line, by disconnecting, from the main line, a high SOC module that is the battery module whose detected SOC level satisfies a high SOC condition, and by excluding the sweep module including the high SOC module.

The power supply system of the configuration described above performs sweep control of sequentially switching the sweep module connected to the main line. Here, the controller detects an SOC for each battery module while electric power is input from outside through the main line. The controller disconnects, from the main line, the high SOC module that is a battery module whose detected SOC level satisfies a condition for a high SOC level. Consequently, charging of the high SOC module is stopped. The controller excludes the sweep module including the high SOC module, and performs sweep control. In this case, when an SOC of one or more of the battery modules increases while the plurality of battery modules are being charged by sweep control, charging of the battery module having increased the SOC is stopped, and charging of the other battery modules continues. That is, even when the SOC of the battery module having low performance increases, charging of battery modules having high performance continues. In addition, since charging of the battery module having an increased SOC is ignored, the possibility that one or more of the battery modules are overcharged decreases so that the lifetime of the battery module increases. Furthermore, the possibility that the battery module having a low SOC level is overdischarged during discharging of the battery modules decreases. Accordingly, a plurality of batteries having different performances can be fully utilized.

In a preferred aspect of the power supply system disclosed here, the switching device of the electric power circuit module includes a first switching device attached to the main line in series and attached to the battery module in parallel, and a second switching device disposed in a circuit that connects the battery modules to the main line in series, the controller is configured to perform the sweep control by sequentially outputting, to each of the plurality of sweep modules, the gate signal for controlling alternate driving of turning the first switching device and the second switching device on and off, at every predetermined delay time, and the controller is configured to output, to the sweep module including the high SOC module, a signal for keeping the first switching device in an on state and the second switching device in an off state in disconnecting the high SOC module from the main line. In this case, sweep control of the plurality of sweep modules and disconnection of the high SOC module in the sweep control can be appropriately performed.

DETAILED DESCRIPTION OF THE PREFERRED EMBODIMENTS

Figure 1:
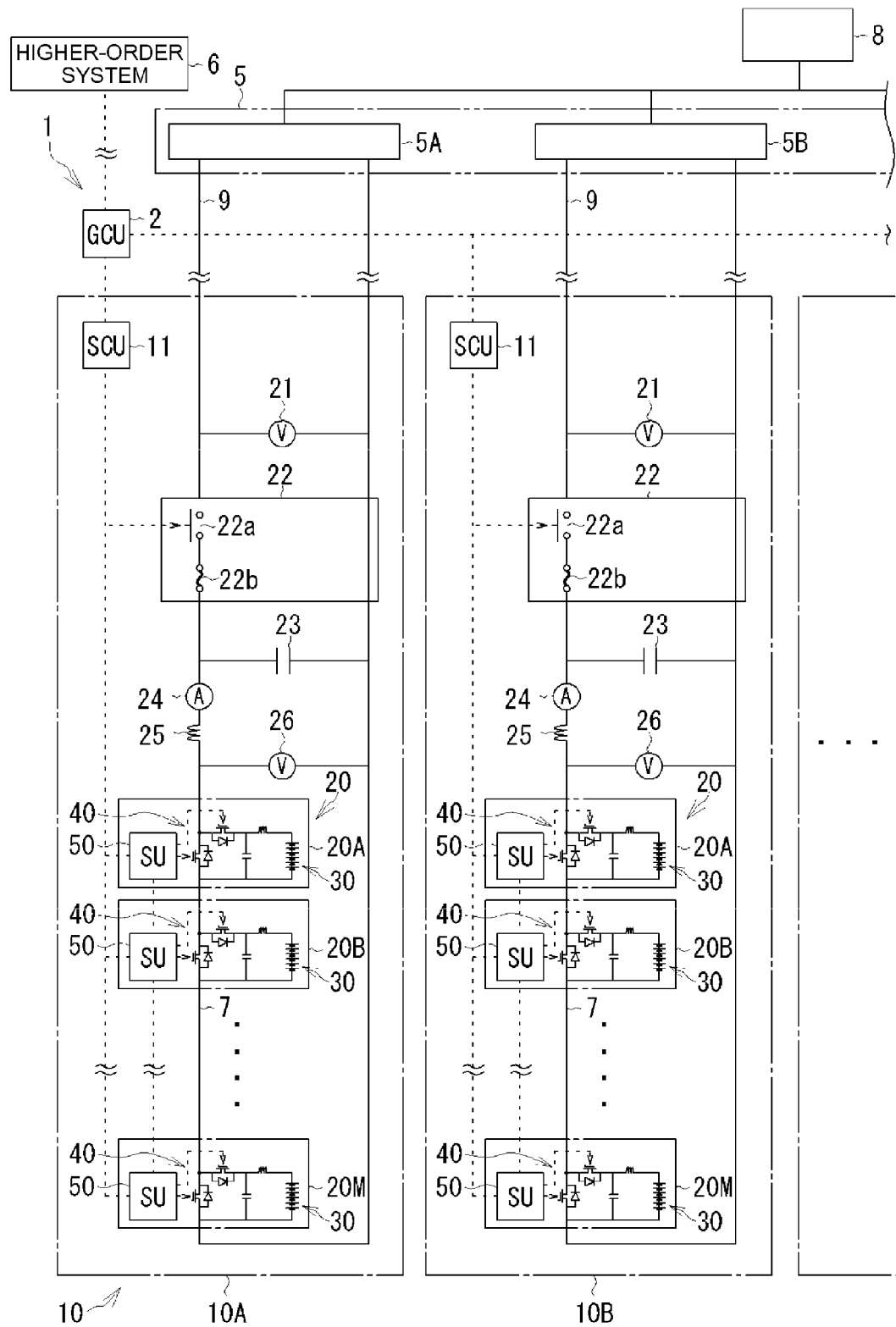
FIG. 1 schematically illustrates a configuration of a power supply system 1.

One exemplary embodiment of the present disclosure will be described hereinafter in detail with reference to the drawings. Matters not specifically mentioned in the description but required for carrying out the disclosure can be understood as matters of design variation of a person skilled in the art based on related art in the field. The present teaching can be carried out on the basis of the contents disclosed in the description and common general knowledge in the field. In the drawings, members and parts having the same functions are denoted by the same reference numerals. In addition, dimensional relationship in each drawing does not reflect an actual dimensional relationship.

<Schematic Overall Configuration>

With reference to FIG. 1, an overall configuration of the power supply system 1 according to this exemplary embodiment will be schematically described. The power supply system 1 performs either output of electric power to a distribution device 5 connected to a higher-order electric power system 8, or storage of electric power input from the distribution device 5 (hereinafter also simply referred to as "input/output of electric power"). In this exemplary embodiment, a power conditioning subsystem (PCS) is used as the distribution device 5, as an example. The PCS has the function of exchanging electric power input from the electric power system 8 to, for example, the power supply system 1 and electric power output from, for example, the power supply system 1 to the electric power system 8, between the power supply system 1, for example, and the electric power system 8.

In a case where electric power is redundant in the electric power system 8, the distribution device 5 outputs the redundant electric power to the power supply system 1. In this case, the power supply system 1 stores electric power input from the distribution device 5. In response to an instruction from a higher-order system 6 for controlling the higher-order electric power system 8, the power supply system 1 outputs the electric power stored in the power supply system 1 to the distribution device 5. In FIG. 1, the higher-order system 6 serves as a system for controlling the electric power system 8 and the distribution device 5 and is disposed separately from the electric power system 8 and the distribution device 5. Alternatively, the higher-order system 6 may be incorporated in the electric power system 8 or the distribution device 5.

The power supply system 1 includes at least one string 10. The power supply system 1 of this exemplary embodiment includes a plurality of (N: N≥2) strings 10 (10A, 10B, ..., 10N). For convenience of illustration, FIG. 1 shows only two strings 10A and 10B of the N strings 10. Each of the strings 10 is a unit of inputting/outputting of electric power to/from the distribution device 5. The strings 10 are connected to the distribution device 5 in parallel. Electric power is input and output (electrification) between the distribution device 5 and each of the strings 10 through a main line 7.

Each of the strings 10 includes a string control unit (SCU) 11 and a plurality of (M: M≥2) sweep modules 20 (20A, 20B, ..., 20M). Each of the sweep modules 20 includes a battery and a control circuit. The SCU 11 is provided in each of the strings 10. The SCU 11 is a controller for integrally controlling the sweep modules 20 included in one string 10. Each of the SCUs 11 communicates with a group control unit (GCU) 2 serving as an electric power controller. The GCU 2 is a controller for integrally controlling an entire group including the strings 10. The GCU 2 communicates with the higher-order system 6 and each of the SCUs 11. Communication among the higher-order system 6, the GCU 2, and SCUs 11 can employ various methods (e.g., at least one of communications such as wired communication, wireless communication, and communication through a network).

The configuration of the controller for controlling, for example, the strings 10 and the sweep modules 20 may be changed. For example, the GCU 2 may be disposed separately from the SCUs 11. Specifically, one controller may control both an entire group including at least one string 10, and the sweep modules 20 included in the string 10.

<Sweep Module>

Figure 2:
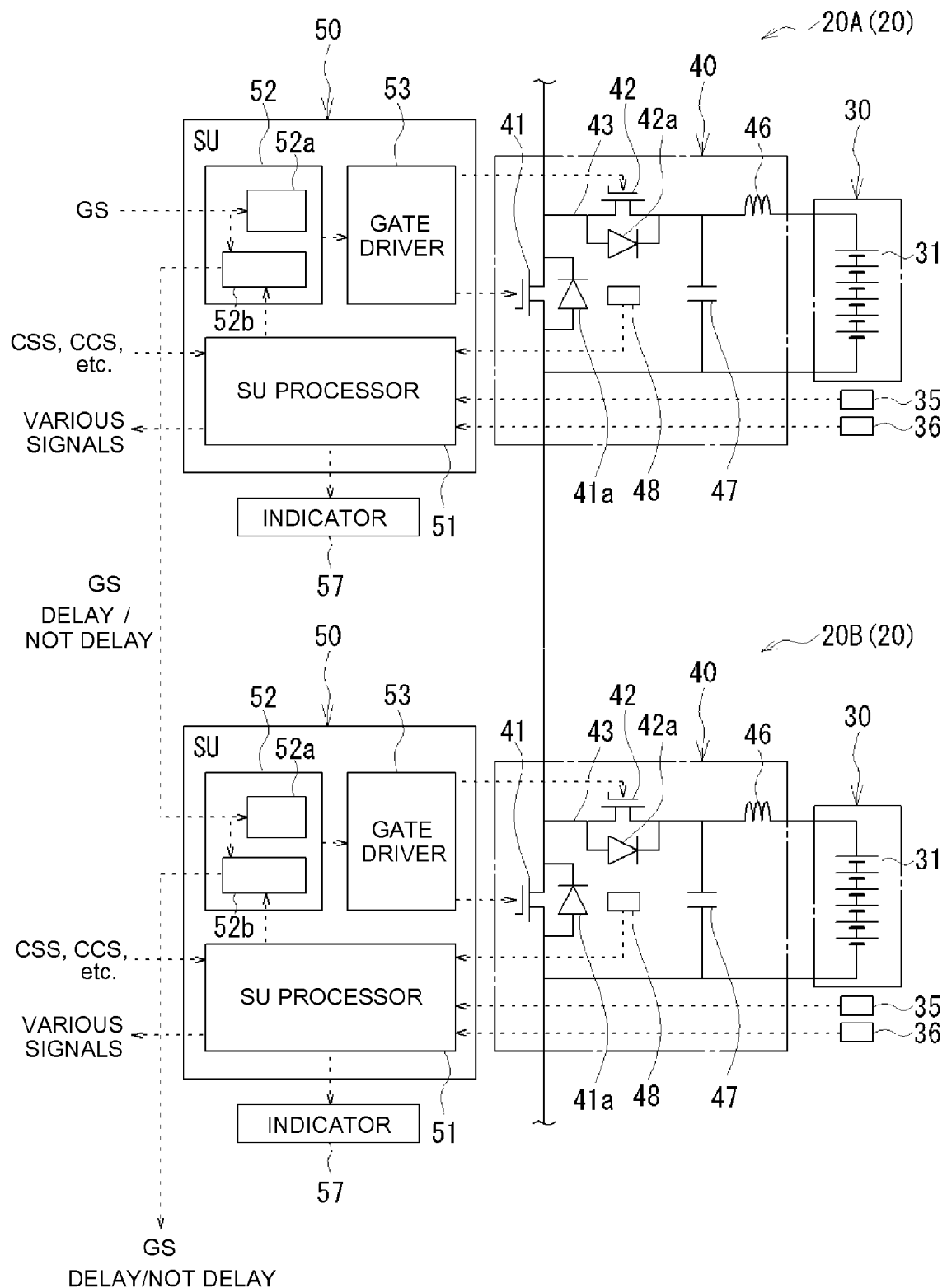
FIG. 2 schematically illustrates a configuration of sweep modules 20.

With reference to FIG. 2, the sweep modules 20 will be described in detail. Each of the sweep modules 20 includes a battery module 30, an electric power circuit module 40, and a sweep unit (SU) 50.

The battery module 30 includes at least one battery 31. The battery module 30 of the exemplary embodiment includes a plurality of batteries 31. The batteries 31 are connected to each other in series. In the exemplary embodiment, secondary batteries are used as the batteries 31. As the batteries 31, at least one of various secondary batteries (i.e., nickel-metal hydride batteries, lithium ion batteries, or nickel-cadmium batteries) may be used. In the power supply system 1, a plurality of types of batteries 31 may be mixed. Of course, all the batteries 31 in the battery module 30 may be of the same type.

A voltage detector 35 and a temperature detector 36 are attached to the battery module 30. The voltage detector 35 detects a voltage of the batteries 31 (batteries 31 connected in series in this exemplary embodiment) included in the battery module 30. The temperature detector 36 detects a temperature of the batteries 31 included in the battery module 30 or a temperature near the batteries 31. Various types of devices (e.g., a thermistor) for detecting a temperature may be used for the temperature detector 36.

The battery module 30 is detachably attached to the electric power circuit module 40. Specifically, in this exemplary embodiment, detachment from the electric power circuit module 40 and attachment to the electric power circuit module 40 are performed using the battery module 30 including the plurality of batteries 31, as one unit. Thus, as compared to a case where the batteries 31 included in the battery module 30 are replaced one by one, the number of jobs in replacing the batteries 31 by an operator can be reduced. In this exemplary embodiment, the voltage detector 35 and the temperature detector 36 may be replaced, separately from the battery module 30. Alternatively, at least one of the voltage detector 35 and the temperature detector 36 may be replaced together with the battery module 30.

The electric power circuit module 40 constitutes a circuit for appropriately implementing input/output of electric power in the battery module 30. In this exemplary embodiment, the electric power circuit module 40 includes at least one switching device for switching a connection state between the battery module 30 and the main line 7 between connection and disconnection. In this exemplary embodiment, the electric power circuit module 40 includes an input/output circuit 43 for connecting the battery module 30 to the main line 7, and a first switching device 41 and a second switching device 42 disposed in the input/output circuit 43. The first switching device 41 and the second switching device 42 perform switching operations in accordance with signals (e.g., gate signals) input from the sweep unit 50.

In this exemplary embodiment, as illustrated in FIG. 2, the first switching device 41 is attached to the main line 7 in series and is attached to the battery module 30 in parallel, in the input/output circuit 43. The second switching device 42 is attached to a portion of the input/output circuit 43 in which the battery module 30 is connected to the main line 7 in series. The first switching device 41 includes source and drain disposed in a forward direction along a direction in which a discharge current flows in the main line 7. The second switching device 42 includes source and drain disposed in a forward direction along a direction in which a charge current flows in the battery module 30, in the input/output circuit 43 through which the battery module 30 is connected to the main line 7 in series. In this exemplary embodiment, the first switching device 41 and the second switching device 42 respectively include body diodes 41*a* and 42*a* that are MOSFETs (e.g., Si-MOSFETs) and oriented in a forward direction. Here, the body diode 41*a* of the first switching device 41 will be referred to as a first body diode as appropriate. The body diode 42*a* of the second switching device 42 will be referred to as a second body diode as appropriate.

The first switching device 41 and the second switching device 42 are not limited to the example illustrated in FIG. 2. Various devices capable of switching a connection state between conduction and non-conduction may be used as the first switching device 41 and the second switching device 42. In this exemplary embodiment, MOSFETs (specifically, Si-MOSFETs) are used for both of the first switching device 41 and the second switching device 42. Alternatively, devices except for MOSFETs (e.g., transistors) may be employed.

The electric power circuit module 40 includes an inductor 46 and a capacitor 47. The inductor 46 is disposed between the battery module 30 and the second switching device 42. The capacitor 47 is connected to the battery module 30 in parallel. In this exemplary embodiment, since secondary batteries are used as the batteries 31 of the battery module 30, degradation of the batteries 31 caused by an increase in an internal resistance loss needs to be suppressed. In view of this, an RLC filter is constituted by the battery module 30, the inductor 46, and the capacitor 47 in order to level a current.

The electric power circuit module 40 includes the temperature detector 48. The temperature detector 48 is disposed to detect heat generation of at least one of the first switching device 41 and the second switching device 42. In this exemplary embodiment, the first switching device 41, the second switching device 42, and the temperature detector 48 are incorporated in one board. Thus, the board itself is replaced with a new one at the time when a failure is found in one of the first switching device 41 and the second switching device 42. Thus, in this exemplary embodiment, one temperature detector 48 is disposed near the first switching device 41 and the second switching device 42 so that the number of components is reduced. The temperature detector for detecting a temperature of the first switching device 41 and a temperature detector for detecting a temperature of the second switching device 42 may be provided separately. Various devices for detecting a temperature (e.g., a thermistor) may be used as the temperature detector 48.

As illustrated in FIGS. 1 and 2, the battery modules 30 in the strings 10 are connected to the main line 7 in series through the electric power circuit modules 40. The battery modules 30 are connected to or disconnected from the main line 7 by appropriately controlling the first switching device 41 and the second switching device 42 of the electric power circuit modules 40. In the example configuration of the electric power circuit module 40 illustrated in FIG. 2, when the first switching device 41 is turned off and the second switching device 42 is turned on, the battery module 30 is connected to the main line 7. When the first switching device 41 is turned on and the second switching device 42 is turned off, the battery module 30 is disconnected from the main line 7.

A sweep unit (SU) 50 is a control unit incorporated in each of the sweep module 20 in order to perform various types of control concerning the sweep module 20. The sweep unit 50 will be also referred to as a sweep control unit. Specifically, the sweep unit 50 outputs a signal for driving the first switching device 41 and the second switching device 42 in the electric power circuit module 40. The sweep unit 50 notifies a higher-order controller (SCU 11 illustrated in FIG. 1 in this exemplary embodiment) of the state of the sweep module 20 (e.g., a voltage of the battery module 30, temperatures of the batteries 31, and the temperatures of the switching devices 41 and 42). The sweep unit 50 is incorporated in each of the sweep modules 20 of the string 10. The sweep units 50 incorporated in the sweep modules 20 of the string 10 are sequentially connected, and sequentially propagates a gate signal GS output from the SCU 11. As illustrated in FIG. 2, in this exemplary embodiment, the sweep unit 50 includes an SU processor 51, a delay/selection circuit 52, and a gate driver 53.

The SU processor 51 is a controller for various processes in the sweep unit 50. A microcomputer, for example, may be used as the SU processor 51. The SU processor 51 receives detection signals from the voltage detector 35, the temperature detector 36, and the temperature detector 48. The SU processor 51 inputs and outputs various types of signals to/from a higher-order controller (the SCU 11 of the string 10 in this exemplary embodiment).

A signal input from the SCU 11 to the SU processor 51 includes a forced through signal CSS and a forced connection signal CCS. The forced through signal CSS is a signal for instructing disconnection of the battery module 30 from the main line 7 (see FIG. 1) extending from the distribution device 5 to the string 10. That is, the sweep module 20 that has received the forced through signal CSS does not perform (passes through) an operation for inputting and outputting electric component to/from the distribution device 5. The forced connection signal CCS is a signal for instructing maintenance of connection of the battery module 30 to the main line 7.

A gate signal GS is input to the delay/selection circuit 52. The gate signal (PWM signal in this exemplary embodiment) GS is a signal for controlling a repetitive switching operation between an on state and an off state of each of the first switching device 41 and the second switching device 42. The gate signal GS is a pulse signal in which on and off are alternately repeated. First, the gate signal GS is input from the SCU 11 (see FIG. 1) to the delay/selection circuit 52 in one of the sweep modules 20. Next, the gate signal GS is sequentially propagated from the delay/selection circuit 52 in one sweep module 20 to the delay/selection circuit 52 in another sweep module 20.

Figure 3:
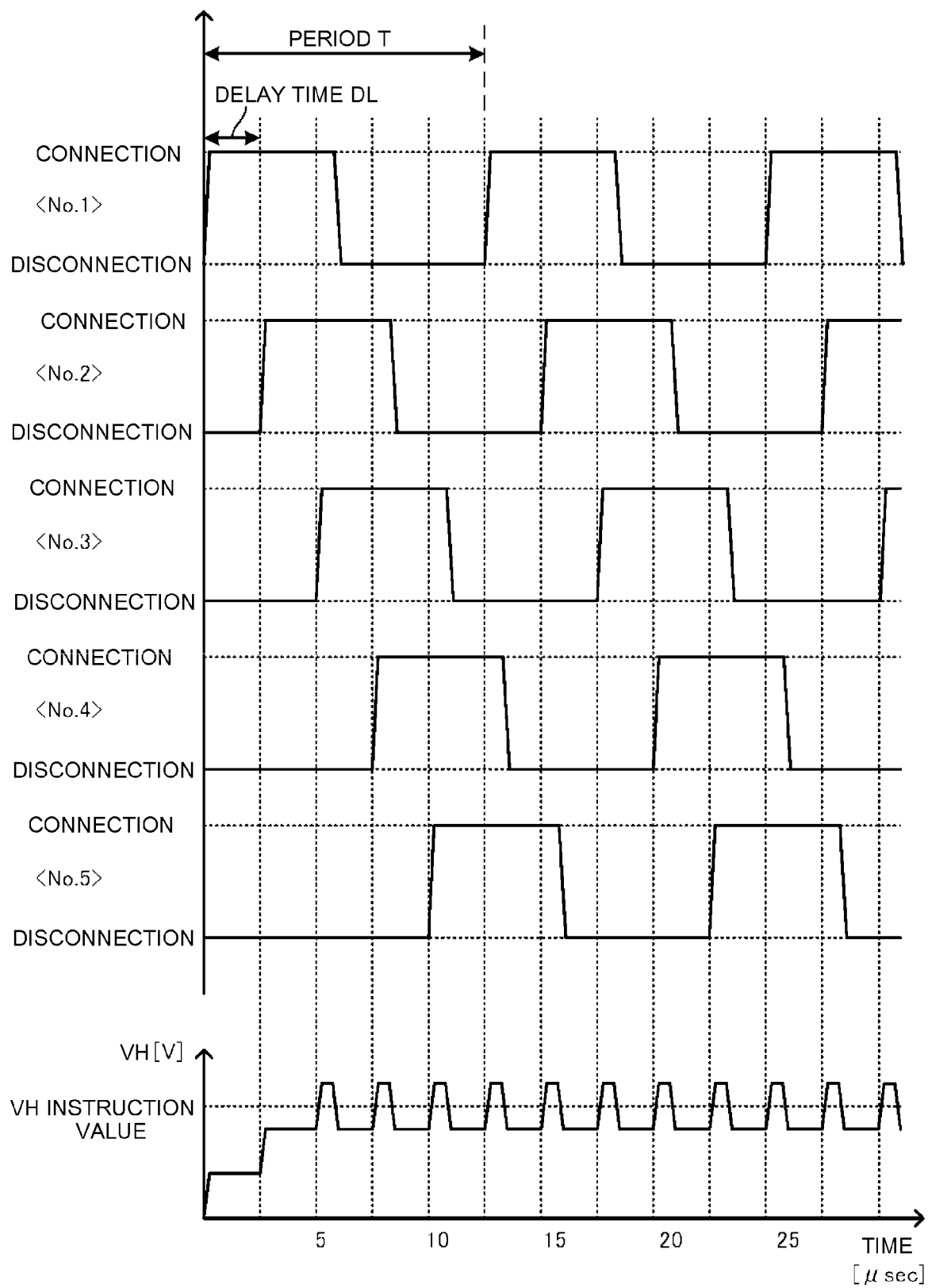
FIG. 3 is an example of a timing chart in a sweep operation.
Figure 4:
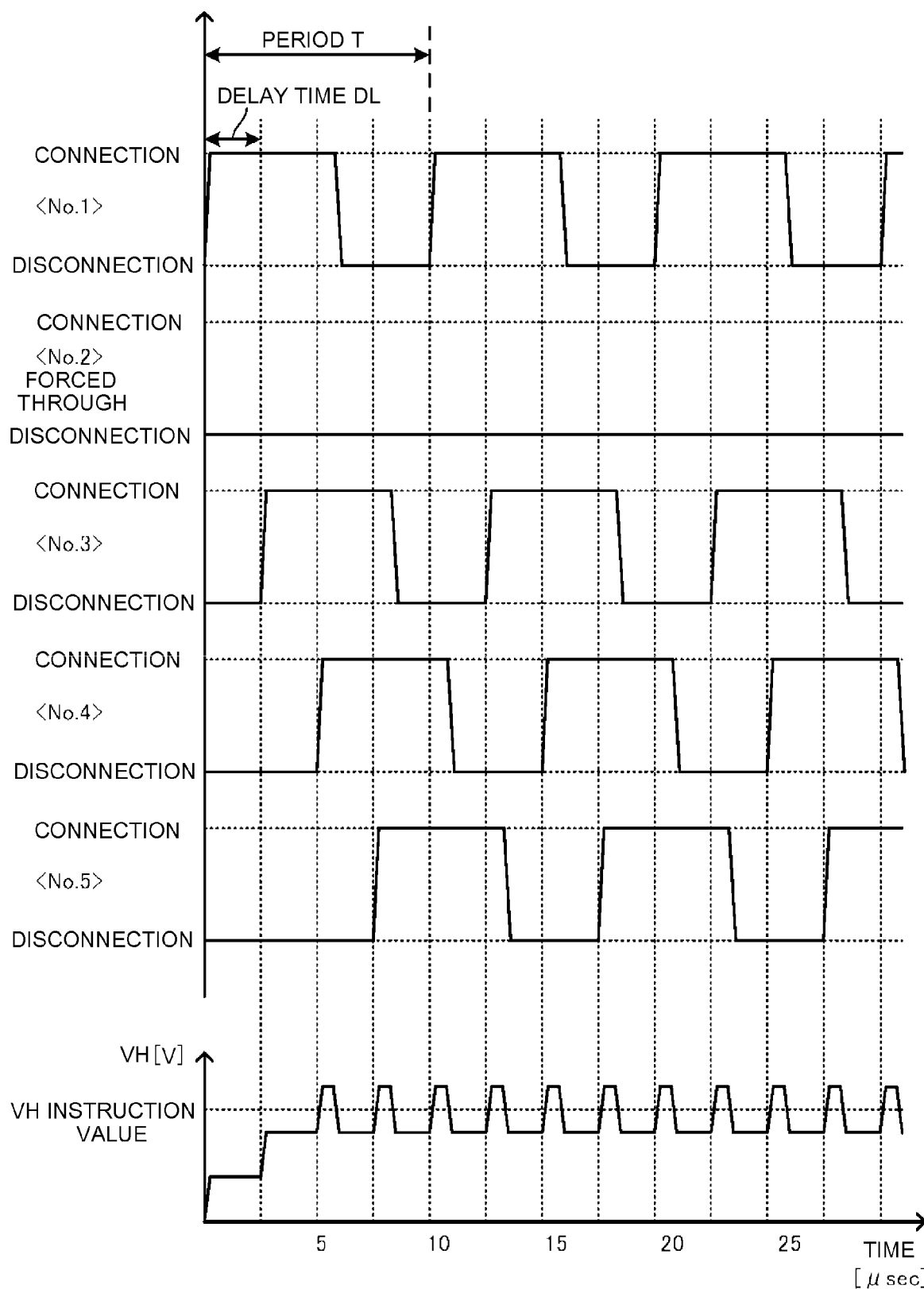
FIG. 4 is an example of a timing chart in a forced through operation.

In the string 10, sweep control shown in FIGS. 3 and 4 is performed. FIG. 3 is an example of a timing chart in a sweep operation. Specifically, FIG. 3 shows an example of a relationship between a connection state of each sweep module 20 and a voltage output to the distribution device 5 in a case where all the sweep modules 20 perform a sweep operation. FIG. 4 is an example of a timing chart in a forced through operation. Specifically, FIG. 4 shows an example of a relationship between a connection state of each sweep module 20 and a voltage output to the distribution device 5 in a case where at least one of the sweep modules 20 performs a forced through operation.

In the sweep control performed in the string 10, in the plurality of (e.g., M) sweep modules 20 incorporated in the string 10, the number (m) of sweep modules 20 that turn on at the same time is defined. The gate signal GS in the sweep control is constituted by, for example, a pulse waveform. In the gate signal GS, signal waveforms for connecting the battery module 30 to the main line 7 and signal waveforms for disconnecting the battery module 30 from the main line 7 are preferably alternately arranged, for example. In the gate signal GS, the signal waveform for connecting the battery modules 30 to the main line 7 preferably includes the number of battery modules 30 connected to the main line 7 in a predetermined period T in which the string 10 is swept. The signal waveform for disconnecting the battery modules 30 from the main line 7 includes a given number of battery modules 30 that need to be disconnected from the main line 7 out of the battery modules 30 incorporated in the string 10. The signal waveform for connecting the battery modules 30 to the main line 7 and the signal waveform for disconnecting the battery modules 30 from the main line 7 are adjusted as appropriate with respect to, for example, the shape of the waveforms.

In the string 10 of the exemplary embodiment, the M sweep modules 20 are connected in series in the order of sweep modules 20A, 20B, . . . , 20M from the side toward the distribution device 5. The side toward the distribution device 5 will be hereinafter referred to as an upstream side, and the side away from the distribution device 5 will be hereinafter referred to as a downstream side. First, a gate signal GS is input from the SCU 11 to the delay/selection circuit 52 of the sweep unit 50 in the sweep module 20A at the most upstream side. Next, the gate signal GS is propagated from the delay/selection circuit 52 in the sweep module 20A to the delay/selection circuit 52 in the sweep module 20B adjacent to the sweep module 20A at the downstream side. Propagation of the gate signal to the adjacent downstream sweep module 20 is sequentially repeated to the most downstream sweep module 20M.

Here, the delay/selection circuit 52 can delay the pulsed gate signal GS input from the SCU 11 or the upstream sweep module 20 by a predetermined delay time and propagate the resulting gate signal GS to the downstream sweep module 20. In this case, a signal indicating the delay time is input from the SCU 11 to the sweep unit 50 (e.g., the SU processor 51 in the sweep unit 50 in this exemplary embodiment). Based on the delay time indicated by the signal, the delay/selection circuit 52 delays propagation of the gate signal GS. The delay/selection circuit 52 may also propagate the input gate signal GS to the downstream sweep module 20 without delay.

The gate driver 53 drives switching operations of the first switching device 41 and the second switching device 42. The delay/selection circuit 52 outputs a signal for controlling driving of the gate driver 53, to the gate driver 53. The gate driver 53 outputs a control signal to each of the first switching device 41 and the second switching device 42. In the case of connecting the battery module 30 to the main line 7, the gate driver 53 outputs control signals for turning the first switching device 41 off and the second switching device 42 on. In the case of disconnecting the battery module 30 from the main line 7, the gate driver 53 outputs control signals for turning the first switching device 41 on and the second switching device 42 off.

The delay/selection circuit 52 of the exemplary embodiment is controlled by a control device such as the SCU 11, and selectively performs a sweep operation, a forced through operation, and a forced connection operation.

For example, in the sweep operation, the first switching device 41 and the second switching device 42 are operated based on the gate signal GS. The battery modules 30 included in the string 10 are connected to the main line 7 in a predetermined order, and are disconnected from the main line 7 in a predetermined order. Consequently, in the string 10, a predetermined number of battery modules 30 are driven while being always connected to the main line 7 with the battery module 30 connected to the main line 7 being sequentially switched in a short control period. With this sweep operation, in the string 10, while the battery module 30 connected to the main line 7 is sequentially switched in a short control period, the string 10 functions as if the string 10 is one battery assembly in which a predetermined number of battery modules 30 are connected in series. To obtain the sweep operation, the sweep modules 20 in the string 10 are controlled by the SCU 11. In this control, the SCU 11 outputs the gate signal GS to the string 10, and outputs a control signal to the SU processor 51 included in each of the sweep modules 20. An example of the sweep operation will be described later in detail with reference to FIGS. 3 and 4.

In the sweep operation, the delay/selection circuit 52 outputs the input gate signal GS to the gate driver 53 without change, delays the gate signal GS by a delay time, and propagates the resulting gate signal GS to the downstream sweep module 20. Consequently, the battery modules 30 of the sweep modules 20 under the sweep operation are sequentially connected to the main line 7 and are sequentially disconnected from the main line 7 while the timings of each of the connection and the disconnection are shifted from one another in the string 10.

In the forced through operation, the delay/selection circuit 52 keeps the first switching device 41 on, independently of the input gate signal GS, and outputs a signal for keeping the second switching device 42 off, to the gate driver 53. Consequently, the battery module 30 in the sweep module 20 under the forced through operation is disconnected from the main line 7. The delay/selection circuit 52 of the sweep module 20 under the forced through operation does not delay the gate signal GS and propagates the gate signal GS to the downstream sweep module 20.

During the forced connection operation, the delay/selection circuit 52 keeps the first switching device 41 off, independently of the input gate signal GS, and outputs a signal for keeping the second switching device 42 on, to the gate driver 53. Consequently, the battery module 30 of the sweep module 20 under the forced connection operation is always connected to the main line 7. The delay/selection circuit 52 of the sweep module 20 under the forced connection operation does not delay the gate signal GS, and propagates the gate signal GS to the downstream sweep module 20.

The delay/selection circuit 52 may be configured as one integrated circuit having necessary functions as described above. The delay/selection circuit 52 may be a combination of a circuit for delaying the gate signal GS and a circuit for selectively sending the gate signal GS to the gate driver 53. An example configuration of the delay/selection circuit 52 of the exemplary embodiment will be described below.

In the exemplary embodiment, as illustrated in FIG. 2, the delay/selection circuit 52 includes a delay circuit 52a and a selection circuit 52b. The gate signal GS input to the delay/selection circuit 52 is input to the delay circuit 52a. The delay circuit 52a delays the gate signal GS by a predetermined delay time, and outputs the resulting gate signal GS to the selection circuit 52b. In another case, the gate signal GS input to the delay/selection circuit 52 is output to the selection circuit 52b through another route not passing through the delay circuit 52a. The selection circuit 52b receives an instruction signal from the SU processor 51, and produces an output in accordance with the instruction signal.

In a case where the instruction signal from the SU processor 51 instructs performing a sweep operation, the selection circuit 52b outputs the input gate signal GS to the gate driver 53 of this sweep module 20 without change. The gate driver 53 outputs a control signal to the electric power circuit module 40, turns the first switching device 41 off, turns the second switching device 42 on, and connects the battery module 30 to the main line 7. On the other hand, the selection circuit 52b outputs the delayed gate signal GS to the delay/selection circuit 52 in the sweep module 20 at a downstream side adjacent to the sweep module 20 which input gate signal GS. That is, in a case where the battery module 30 is connected to the main line 7 in the sweep operation, the gate signal GS delayed by the predetermined delay time is sent to the adjacent downstream sweep module 20.

In a case where the instruction signal from the SU processor 51 is the forced through signal CSS, the selection circuit 52b outputs a signal for passing through the battery module 30, to the gate driver 53. By continuing the forced through signal CSS, the battery module 30 in the sweep module 20 that has received the forced through signal CSS is kept disconnected from the main line 7. In this case, the selection circuit 52b outputs a gate signal GS input to the selection circuit 52b through a route not passing through the delay circuit 52a, to the adjacent downstream sweep module 20.

In a case where the instruction signal from the SU processor 51 is the forced connection signal CCS, the selection circuit 52b outputs, to the gate driver 53, a signal for connecting the battery module 30 to the main line 7. That is, the gate driver 53 turns the first switching device 41 off, turns the second switching device 42 on, and connects the battery module 30 to the main line 7. By continuing the forced connection signal CCS, the battery module 30 is kept connected to the main line 7. In this case, the selection circuit 52b outputs a gate signal GS input to the selection circuit 52b through a route not passing through the delay circuit 52a, to the adjacent downstream sweep module 20.

As illustrated in FIGS. 1 and 2, in this exemplary embodiment, the plurality of sweep units 50 (specifically a plurality of delay/selection circuits 52) included in one string 10 are connected sequentially to each other in a daisy chain mode. Consequently, the gate signal GS input to one sweep unit 50 from the SCU 11 is sequentially propagated among the plurality of sweep units 50. Thus, processing in the SCU 11 can be easily simplified, and an increase in number of signals can be easily suppressed. Alternatively, the SCU 11 may output a gate signal GS to each of the plurality of sweep units 50 independently of each other.

The sweep unit 50 includes an indicator 57. The indicator 57 notifies an operator of a state of the sweep module 20 including the battery module 30, the electric power circuit module 40, and other components, for example. The indicator 57 is capable of notifying the operator that a problem (e.g., a failure or degradation of the batteries 31) is detected in the battery module 30 in the sweep module 20 (i.e., the battery module 30 needs to be replaced).

As an example, an LED that is a light-emitting device is used for the indicator 57 of the exemplary embodiment. Alternatively, a device except for an LED (e.g., a display) may be used as the indicator 57. A device for outputting voice (e.g., a loudspeaker) may be used as the indicator 57. The indicator 57 may notify the operator of the state of the sweep module 20 by driving a member by an actuator (e.g., a motor or a solenoid). The indicator 57 is preferably configured to indicate a state by various methods in accordance with the state of the sweep module 20.

In the exemplary embodiment, operation of the indicator 57 is controlled by the SU processor 51 in the sweep unit 50. Alternatively, the operation of the indicator 57 may be controlled by a controller (e.g., the SCU 11) except for the SU processor 51

In the exemplary embodiment, the indicator 57 is disposed for each of the sweep unit 50. Thus, the operator can easily identify the sweep module 20 whose state is notified by the indicator 57 among the plurality of sweep modules 20. Alternatively, the configuration of the indicator 57 may be changed. For example, separately from the indicator 57 disposed for each sweep unit 50, or together with the indicator 57, a state notifier for notifying a summary of states of the plurality of sweep modules 20 may be disposed. In this case, the state notifier may display a summary of the states of the plurality of sweep modules 20 (e.g. whether a problem occurs or not) on one monitor.

<Sweep Control>

Sweep control performed in the string 10 will be described. Here, the sweep control is a control for causing the battery modules 30 in the string 10 to perform a sweep operation. In the sweep control performed in the string 10, the SCU 11 outputs a pulsed gate signal GS. The switching devices 41 and 42 in the sweep modules 20 of the strings 10 are switched between on and off to be driven as appropriate. Consequently, connection of the battery module 30 to the main line 7 and disconnection of the battery module 30 from the main line can be switched from each other at high speed for each of the sweep modules 20. In addition, the string 10 can delay the gate signal GS input to the X-th sweep module 20 from the upstream side with respect to the gate signal GS input to the (X−1)th sweep module 20. Consequently, among the M sweep modules 20 included in the string 10, m (m<M) sweep modules 20 connected to the main line 7 are sequentially switched. Accordingly, the plurality of battery modules 30 included in the string 10 are connected to the main line 7 in a predetermined order and disconnected from the main line 7 in a predetermined order. Then, a state as if a predetermined number of battery modules 30 are always connected to the main line 7 can be obtained. With the sweep operation, the string 10 functions as one battery assembly in which a predetermined number of battery modules 30 are connected in series.

FIG. 3 is a timing chart showing an example of a relationship between a connection state of each sweep module 20 and a voltage output to the distribution device 5 in a case where all the sweep modules 20 included in the string 10 are caused to perform a sweep operation. The number M of the sweep modules 20 included in one string 10 may be changed as appropriate. In the example shown in FIG. 3, one string 10 includes five sweep modules 20, and all the five sweep modules 20 are caused to perform the sweep operation.

In the example shown in FIG. 3, a VH instruction signal for setting a voltage VH [V] to be output to the distribution device 5 at 100 V is input to the SCU 11 of the string 10. A voltage Vmod [V] of the battery module 30 in each of the sweep modules 20 is 43.2 V. A delay time DL [µsec] for delaying the gate signal GS is set as appropriate in accordance with requirements for the power supply system 1. A period T (i.e., a period for connection or disconnection of the sweep module 20) of the gate signal GS is a value obtained by multiplying, by a delay time DL, the number P (≥M) of sweep modules 20 caused to perform the sweep operation. Thus, if the delay time DL is long, the frequency of the gate signal GS is a low frequency. On the other hand, if the delay time DL is short, the frequency of the gate signal GS is a high frequency. In the example shown in FIG. 3, the delay time DL is set at 2.4 μsec. Thus, the period T of the gate signal GS is "2.4 μsec×5=12 μsec."

In this exemplary embodiment, the battery module 30 of the sweep module 20 in which the first switching device 41 is off and the second switching device 42 is on, is connected to the main line 7. That is, when the first switching device 41 is turned off and the second switching device 42 is turned on, the capacitor 47 connected to the battery module 30 in parallel is connected to the input/output circuit 43, and electric power is input or output. The sweep unit 50 of the sweep module 20 connects the battery module 30 to the main line 7 while the gate signal GS is on. On the other hand, the battery module 30 of the sweep module 20 in which the first switching device 41 is off and the second switching device 42 is on, is disconnected from the main line 7. The sweep unit 50 disconnects the battery module 30 from the main line 7 while the gate signal GS is off.

When the first switching device 41 and the second switching device 42 are turned on at the same time, a short circuit occurs. Thus, in the case of switching the first switching device 41 and the second switching device 42, the sweep unit 50 switches one of the devices from on to off, and after a lapse of a small standby time, then switches the other device from off to on. As a result, occurrence of a short circuit is prevented.

Supposing a VH instruction value instructed by the VH instruction signal is VH_com, voltage of each battery module 30 is Vmod, the number of sweep modules 20 to perform a sweep operation (i.e., the number of sweep modules 20 as connection targets to the main line 7 in the sweep control) is P. In this case, in the gate signal GS, a duty ratio occupied by an on-period in the period T is obtained by "VH_com/(Vmod×P)." In the example shown in FIG. 3, the duty ratio of the gate signal GS is about 0.46. Strictly, the duty ratio is shifted under the influence of the standby time for preventing occurrence of a short circuit. Thus, the sweep unit 50 may correct the duty ratio by using a feedback process or a feedforward process.

As shown in FIG. 3, when the sweep control starts, one (e.g., the sweep module 20 of No. 1 at the most upstream side in the example shown in FIG. 3) of P sweep modules 20 comes to be in a connected state. Thereafter, after a lapse of a delay time DL, the next sweep module 20 (e.g., the second sweep module 20 of No. 2 from the upstream side in the example shown in FIG. 3) also comes to be in a connected state. In this state, a voltage VH output to the distribution device 5 is the sum of voltages of the two sweep modules 20, and does not reach a VH instruction value. Subsequently, after a lapse of the delay time DL, the sweep module 20 of No. 3 comes to be in a connected state. In this state, the number of sweep modules 20 connected to the main line 7 is three, that is, No. 1 through No. 3. Thus, the voltage VH output to the distribution device 5 is the sum of voltages of the three sweep modules 20, which is larger than the VH instruction value. Subsequently, when the sweep modules 20 of No. 1 is disconnected from the main line 7, the voltage VH returns to the sum of the voltages of the two sweep modules 20. After a lapse of the delay time DL from the start of connection of No. 3, the sweep module 20 of No. 4 comes to be in a connected state. Consequently, the number of sweep modules 20 connected to the main line 7 is three, that is, No. 2 through No. 4. As described above, with the sweep control, m (three in FIG. 3) sweep modules 20 connected to the main line 7 out of the M (five in FIG. 3) sweep modules 20 are sequentially switched.

As shown in FIG. 3, the VH instruction value is not divisible by the voltage Vmod of each battery module 30 in some cases. In such cases, the voltage VH output to the distribution device 5 varies. The voltage VH, however, is levelled by the RLC filter, and is output to the distribution device 5. In a case where electric power input from the distribution device 5 is stored in the battery module 30 of each of the sweep modules 20, the connection state of the sweep module 20 is controlled, in a manner similar to the timing chart of FIG. 3.

<Forced Through Operation>

With reference to FIG. 4, description will be given on control in a case where one or more of the sweep modules 20 are caused to perform a forced through operation and the other sweep module(s) 20 is/are caused to perform a sweep operation. As described above, the sweep module 20 instructed to perform a forced through operation keeps a state in which the battery module 30 is disconnected from the main line 7. The example shown in FIG. 4 is different from the example shown in FIG. 3 in that the sweep module 20 of No. 2 is caused to perform a forced through operation. That is, in the example shown in FIG. 4, the number of sweep modules 20 caused to perform a sweep operation (i.e., the number of sweep modules 20 as connection targets to the main line 7) P is four in the five sweep modules 20 included in one string 10. The VH instruction value, the voltage Vmod of each battery module 30, and the delay time DL are the same as those in the example shown in FIG. 3. In the example shown in FIG. 4, a period T of the gate signal GS is "2.4 μsec×4=9.6 μsec." A duty ratio of the gate signal GS is about 0.58.

As shown in FIG. 4, in the case where one or more of the sweep modules 20 (e.g., the sweep module 20 of No. 2 in FIG. 4) are caused to perform the forced through operation, the number P of sweep modules 20 caused to perform the sweep operation is smaller than that in the example shown in FIG. 3. However, the string 10 adjusts the period T of the gate signal GS and the duty ratio of the gate signal GS in accordance with the decrease of the number P of the sweep modules 20 caused to perform the sweep operation. Consequently, a waveform of the voltage VH output to the distribution device 5 is the same as the waveform of the voltage VH shown in FIG. 3 as an example. Thus, even in the case of increasing or reducing the number P of the sweep modules 20 caused to perform the sweep operation, the string 10 can output an instructed voltage VH to the distribution device 5 as appropriate.

In a case where a problem (e.g., degradation or a failure) occurs in the battery 31 of one of the sweep modules 20, for example, the string 10 is capable of causing the sweep module 20 including the battery 31 suffering from the problem to perform the forced through operation. Thus, the string 10 is capable of outputting an instructed voltage VH to the distribution device 5 appropriately by using the sweep modules 20 suffering from no problems. In addition, it is possible for the operator to replace the battery module 30 including the battery 31 suffering from a problem (i.e., the battery module 30 of the sweep module 20 caused to perform the forced through operation) while allowing the string 10 to operate normally. In other words, in the power supply system 1 of the exemplary embodiment, it is unnecessary to stop an operation of the entire string 10 in replacing the battery module 30.

In a case where one or more of the sweep modules 20 are caused to perform the forced connection operation, the connection states of these sweep modules 20 caused to perform the forced connection operation is an always connection state. For example, in the case of causing the sweep module 20 of No. 2 shown in FIG. 4 is caused to perform not the forced through operation but the forced connection operation, the connection state of No. 2 is kept not "disconnected" but "connected."

In the case where the power supply system 1 includes a plurality of strings 10, the sweep control is performed in each of the strings 10. The controller for integrally controlling the entire power supply system 1 (the GCU 2 in this exemplary embodiment) controls operations of the plurality of strings 10 in order to satisfy an instruction from the higher-order system 6. For example, in a case where only one string 10 cannot satisfy a VH instruction value required by the higher-order system 6, the GCU 2 causes the plurality of strings 10 to output electric power so that the VH instruction value is satisfied.

<String>

With reference to FIG. 1, an entire configuration of the strings 10 and the power supply system 1 will be described in detail. As described above, each string 10 includes the SCU 11 and the plurality of sweep modules 20 connected to the main line 7 in series through the electric power circuit modules 40. The main line 7 of the string 10 is connected to a bus line 9 extending from the distribution device 5. The string 10 includes, from the side toward the distribution device 5 (upstream side) in the main line 7, a bus line voltage detector 21, a system breaker (also referred to as a system main relay (SMR) as appropriate) 22, a string capacitor 23, a string current detector 24, a string reactor 25, and a string voltage detector 26. Arrangement of one or more of the members may be changed. For example, the system breaker 22 may be disposed downstream of the string capacitor 23.

The bus line voltage detector 21 detects a voltage on the bus line 9 extending from the distribution device 5 to the string 10. The system breaker 22 switches the connection state between the string 10 and the distribution device 5 between connection and disconnection. In this exemplary embodiment, the system breaker 22 is driven in accordance with a signal input from the SCU 11. The string capacitor 23 and the string reactor 25 constitute an RLC filter to thereby level a current. The string current detector 24 detects a current flowing between the string 10 and the distribution device 5. The string voltage detector 26 detects a voltage as the sum of voltages of the plurality of sweep modules 20 connected to the main line 7 in series in the string 10, that is, a string voltage of the string 10.

In the configuration illustrated in FIG. 1, the system breaker 22 includes a switch 22a and a fuse 22b. The switch 22a is a device for connecting and disconnecting the string 10 to/from the distribution device 5. The switch 22a will be also referred to as a string switch, as appropriate. When the switch 22a is turned on, the main line 7 of the string 10 and the bus line 9 of the distribution device 5 are connected to each other. When the switch 22a is turned off, the string 10 is disconnected from the distribution device 5. The switch 22a is controlled by the SCU 11 for controlling the string 10. By operating the switch 22a, the string 10 is disconnected and connected from/to the distribution device 5, as appropriate. The fuse 22b is a device for stopping a flow of an unexpected large current in terms of design of the string 10 in the main line 7 of the string 10 in a case where the large current flows in the main line 7. The fuse 22b will be referred to as a string fuse, as appropriate.

Here, if batteries satisfying the same standard are incorporated in one battery module 30, the voltage of the battery module 30 increases as the number of incorporated batteries increases. On the other hand, if the voltage of the battery module 30 is high, danger arises in handling by an operator, and the system is heavy. In view of this, one battery module 30 preferably includes a large number of batteries within the range where the voltage of the battery module 30 is at such a level that a touch by a person with the module 30 in a fully charged state does not cause a serious accident (e.g., less than 60 V, preferably less than 42 V) and the battery module 30 has such a weight that one operator can replace the systems. The battery module 30 incorporated in the string 10 does not need to be constituted by exactly the same type of batteries, and the number of batteries incorporated in one battery module 30 may be determined in accordance with the type and standard of batteries incorporated in the battery module 30. The string 10 is configured such that the sweep modules 20 including the battery modules 30 are connected in series to thereby enable an output of a predetermined voltage. The power supply system 1 is configured to enable an output of a predetermined level of electric power for connection to the electric power system 8 by combining the plurality of strings 10.

In this exemplary embodiment, the distribution device 5 to which the strings 10 of the power supply system 1 are connected includes sub-distribution devices 5A and 5B respectively connected to the strings 10A and 10B. The strings 10A and 10B connected to the sub-distribution devices 5A and 5B are connected in parallel through the sub-distribution devices 5A and 5B. The distribution device 5 controls distribution of electric power input from the electric power system 8 to the strings 10A and 10B, integration of electric power output from the strings 10A and 10B to the electric power system 8, and so forth through the sub-distribution devices 5A and 5B connected to the strings 10. The distribution device 5 and the sub-distribution devices 5A and 5B are controlled such that the power supply system 1 including the strings 10 functions as one power supply device as a whole by cooperation of the GCU 2 connected to the higher-order system 6 and the SCUs 11 for controlling the strings 10.

For example, in this exemplary embodiment, the downstream side of the distribution device 5, that is, a side toward the strings 10A and 10B, is controlled by a direct current (DC). The upstream side of the distribution device 5, that is, the electric power system 8, is controlled by an alternating current (AC). The voltages of the strings 10A and 10B are controlled to be substantially balanced with respect to the voltage of the electric power system 8, through the distribution device 5. When the voltages of the strings 10A and 10B are controlled to be lower than the voltage of the electric power system 8, a current flows from the electric power system 8 to the strings 10A and 10B. At this time, when sweep control is performed in each of the strings 10A and 10B, the battery modules 30 are charged as appropriate. When the voltages of the strings 10A and 10B are controlled to be higher than the voltage of the electric power system 8, a current flows form the strings 10A and 10B to the electric power system 8. At this time, when sweep control is performed in each of the strings 10A and 10B, the battery modules 30 are discharged as appropriate. The distribution device 5 may be controlled such that the voltages of the strings 10A and 10B are kept to be balanced with respect to the voltage of the electric power system 8 so that substantially no current flows in the strings 10A and 10B. In this exemplary embodiment, such control can be performed for each of the sub-distribution devices 5A and 5B to which the strings 10A and 10B are connected. For example, control may be performed such that the voltage of each of the strings 10A and 10B is adjusted so that substantially no current flows in one of the strings 10A and 10B connected to the distribution device 5.

In the power supply system 1, the number of strings 10 connected to the distribution device 5 in parallel is increased so that the capacity of the power supply system 1 as a whole can be increased. For example, in the power supply system 1, a large-size system capable of producing an output that can absorb an abrupt increase in demand of the electric power system 8 and of compensating for a sudden power shortage of the electric power system 8 can be assembled. For example, an increase in the capacity of the power supply system 1 can use large redundant electric power of the electric power system 8 for charging of the power supply system 1 as appropriate. For example, in a case where an output of an electric power station is redundant in a time zone where electric power demand is low at midnight or a case where the amount of power generation rapidly increases in a large solar power station, the power supply system 1 can absorb redundant electric power through the distribution device 5. In contrast, in a case where demand for electric power rapidly increases in the electric power system 8, required electric power can be output from the power supply system 1 to the electric power system 8 through the distribution device 5 as appropriate, in accordance with an instruction from the higher-order system 6. In this manner, the power supply system 1 compensates for an electric power shortage of the electric power system 8 as appropriate.

In the power supply system 1, all the plurality of battery modules 30 incorporated in the strings 10 do not need to be always connected. Since the forced through operation can be performed for each of the battery modules 30 as described above, when an abnormality occurs in one of the battery modules 30, this battery module 30 can be disconnected from the sweep control of the string 10. Thus, in the power supply system 1, batteries used for the battery modules 30 do not need to be unused new batteries.

For example, secondary batteries used as a drive power source for an electric vehicle such as a hybrid vehicle or an electric automobile can be reused. Even if a secondary battery used as such a drive power supply is used for about 10 years, this secondary battery can sufficiently function as a secondary battery. In the power supply system 1, the battery module 30 showing abnormality can be immediately disconnected, and thus, batteries can be incorporated after confirmation that the batteries have necessary given functions. Secondary batteries used as a power for driving an electric vehicle sequentially reach periods for collection. The power supply system 1 can also incorporate secondary batteries corresponding to 10,000 electric vehicles, and is expected to absorb a considerable amount of collected secondary batteries. It is unexpected when functions of the secondary batteries used as a power supply for driving electric vehicles degrade. In a case where such secondary batteries are reused for the battery modules 30 of the power supply system 1, it is impossible to expect when a problem occurs in the battery modules 30.

However, in the power supply system 1 proposed here, the battery modules 30 can be appropriately disconnected through the sweep modules 20. Thus, even when a problem occurs in the battery module 30 or a secondary battery incorporated in the battery module 30, it is unnecessary to stop the entire power supply system 1.

<Charge Control Process>

Figure 5:
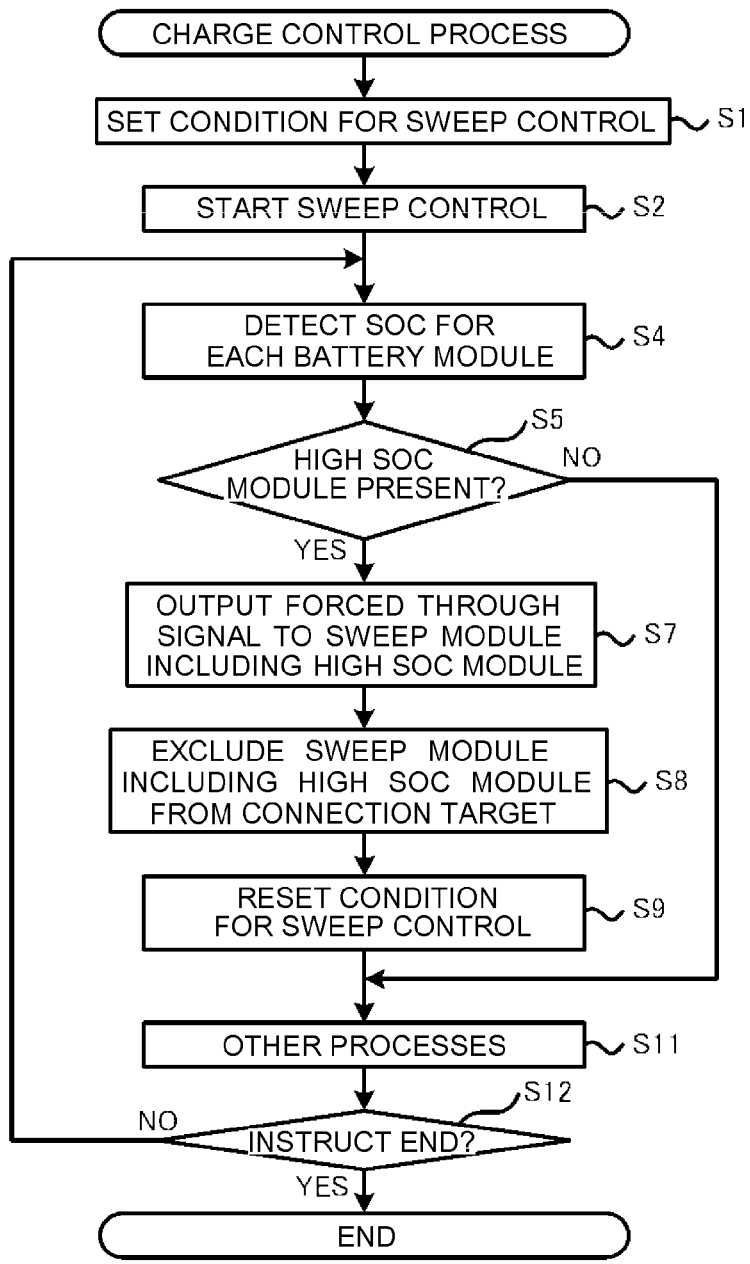
FIG. 5 is a flowchart of an energizing control process performed by the power supply system 1.

In the charge control process, to fully exhibit functions of the plurality of battery modules 30 included in one string 10, charging if the battery modules 30 are performed by sweep control. With reference to FIG. 5, a charge control process performed by the power supply system 1 of this exemplary embodiment will be described.

The charge control process exemplified in the exemplary embodiment is performed by the SCUs 11 serving as controllers (control units) included in the strings 10. When each of the SCUs 11 receives, from the GCU 2, an instruction for starting charging of electric power input from the distribution device 5, the SCU 11 starts the charge control process shown in FIG. 5. The controllers that perform the charge control process are not limited to the SCUs 11. For example, the GCU 2 may perform the charge control process, or a controller for performing a charge control process may be provided in addition to the SCUs 11 and the GCU 2. A plurality of controllers (e.g., the SCUs 11 and the sweep units 50) may perform a charge control process in cooperation.

When the charge control process starts, the SCU 11 sets conditions for sweep control (S1). For example, based on, for example, the number P of sweep modules 20 as connection targets to the main line 7 in the sweep control, the SCU 11 sets conditions for the sweep control, such as a delay time DL and a period T of a gate signal GS. In accordance with the set conditions, the SCU 11 starts sweep control (S2). In the charge control process, electric power is input from the distribution device 5 through the main line 7. Thus, the battery modules 30 in the sweep modules 20 performing the sweep operation are gradually charged with the input electric power.

The SCU 11 detects a state of charge (SOC) for each battery module 30 in the string 10 (S4). A specific method for detecting the SOC of the battery module 30 can be selected as appropriate. For example, the SCU 11 may detect the SOC based on the voltage of the battery module 30 detected by the voltage detector 35. The SOC may be detected in consideration of the temperature of the battery module 30 detected by the temperature detector 36 together with the voltage thereof. The SOC may be detected in consideration of a current flowing in the battery module 30. The SCU 11 may detect the SOC based on an open-circuit voltage of the battery module 30 and an integrated value of a current flowing in the battery module 30.

The SCU 11 determines whether the plurality of battery modules 30 in the string 10 include the battery module 30 whose SOC level detected in S4 satisfies a specific condition (condition for high SOC) or not (S5). The condition for high SOC (high SOC condition) is a condition for an SOC set to determine the sweep module 20 for which charging by sweep control is stopped first among the plurality of sweep modules 20 performing a sweep operation. That is, when charging of the battery modules 30 proceeds to increase the SOC level so that the increased SOC level satisfies the high SOC condition, charging of the battery module 30 satisfying the condition is stopped. The high SOC condition can be set as appropriate. The high SOC condition may be a condition that the detected SOC level is a threshold or more. In this case, the threshold may be previously determined or may be changed in accordance with, for example, an operation instruction by an operator. It may be determined that the high SOC condition is satisfied if a proportion of a detected SOC is greater than or equal to a specific proportion (e.g., α times: α>1) as compared to an SOC level of another battery module 30 in the string 10 (with respect to an average of SOC levels of all the battery modules 30 in the string 10). In the plurality of battery modules 30 being charged by sweep control, the SOC of the battery module 30 having lower performance is likely to increase in a shorter time than the SOC of the battery module 30 having higher performance. Unless the battery modules 30 does not include the battery module 30 satisfying the high SOC condition (hereinafter referred to as a "high SOC module") (that is S5: NO), the process proceeds to S11.

If the battery modules 30 include a high SOC module (S5: YES), the SCU 11 outputs the forced through signal CSS to the sweep module 20 including the high SOC module (S7). Consequently, the high SOC module is disconnected from the main line 7, and charging of the high SOC module is stopped. The SCU 11 excludes the sweep module 20 including the high SOC module from connection targets to the main line 7 in the sweep control (S8). The SCU 11 resets conditions for the sweep control, and continues the sweep control under the reset condition (S9). Consequently, charging of another battery module 30 by the sweep control is performed with the charging of the high SOC module stopped. That is, even when charging of the battery module 30 having lower performance is finished, charging of battery modules 30 having high performance is appropriately performed. Thus, in a case where battery modules 30 having different performances are mixed, the battery module 30 can be fully utilized. In the exemplary embodiment, a time in which no current flows in the high SOC module increases. Thus, if the batteries 31 in the high SOC module are nickel-metal hydride batteries, absorption of hydrogen generated in the batteries 31 progresses while no current flows. Accordingly, an increase in the internal pressure of the batteries 31 can be easily suppressed. In addition, since the time in which no current flows increases, an increase in temperature of the batteries 31 can be easily suppressed. In addition, since charging of the high SOC module is ignored, the possibility that the high SOC module is in an overcharged state decreases, resulting an increase in lifetime of the battery modules. Furthermore, the possibility that the battery module 30 having a low SOC level is overdischarged in discharging the battery modules 30 decreases.

Next, the SCUs 11 performs various processes (S11). For example, in a case where an instruction from a higher-order controller (i.e., the GCU 2 in this exemplary embodiment) is changed, the SCU 11 resets driving conditions for the plurality of sweep modules 20 based on the changed instruction. Thereafter, the SCU 11 determines whether an instruction for finishing charging by sweep control is input or not (S12). If the instruction is not input (S12: NO), the process returns to S4, and charging by the sweep control continues. If the finishing instruction is input (S12: YES), the charge control process is finished.

The technique disclosed in this exemplary embodiment is merely an example. Thus, the technique exemplified in the above exemplary embodiment may be changed. For example, in the above exemplary embodiment, SOCs of the plurality of battery modules 30 are detected by the SCU 11. Alternatively, an SOC may be detected by another controller (e.g., the sweep unit 50).

The process of performing the sweep control in S2 of FIG. 5 is an example of "first process." In S4, S5, and S7 through S9 of FIG. 5, the process of continuing charging by sweep control with the high SOC module disconnected from the main line 7 is an example of a "second process."

Specific examples of the present teaching have been described in detail hereinbefore, but are merely illustrative examples, and are not intended to limit the scope of claims. The techniques described in the scope of claims include various modifications and changes of the above described exemplary embodiment.

What is claimed is:

1. A power supply system comprising:
a main line configured to energize at least electric power input from outside;
a plurality of sweep modules connected to the main line; and
a controller, wherein
each of the plurality of sweep modules includes
a battery module including at least one battery, and
an electric power circuit module including at least one switching device that switches a connection state between the battery module and the main line between connection and disconnection, and
the controller is configured to perform
a first process of performing sweep control of sequentially switching the battery module connected to the main line among the plurality of battery modules between connection and disconnection by outputting a gate signal for controlling the switching device to the electric power circuit module, wherein an upstream-most sweep module of the plurality of sweep modules receives the gate signal from the controller, and then the upstream-most sweep module propagates the gate signal directly to a first downstream sweep module, and the first downstream sweep module propagates the gate signal directly to a second downstream sweep module, such that the sweep control of the first process switches the battery modules in a sequence from the upstream-most sweep module to a downstream-most sweep module, and
a second process of performing the sweep control by (i) detecting an SOC in each of the battery modules while electric power is input from outside through the main line, and by (ii) disconnecting, from the main line, a high SOC module that is the battery module whose detected SOC level satisfies a high SOC condition, and by excluding the sweep module including the high SOC module.

2. The power supply system according to claim 1, wherein
the switching device of the electric power circuit module includes
a first switching device attached to the main line in series and attached to the battery module in parallel, and
a second switching device disposed in a circuit that connects the battery modules to the main line in series,
the controller is configured to perform the sweep control by sequentially outputting, to each of the plurality of sweep modules, the gate signal for controlling alternate driving of turning the first switching device and the second switching device on and off, at every predetermined delay time, and
the controller is configured to output, to the sweep module including the high SOC module, a signal for keeping the first switching device in an on state and the second switching device in an off state in disconnecting the high SOC module from the main line.

\* \* \* \* \*